United States Patent [19]

Asano et al.

[11] Patent Number: 4,887,059
[45] Date of Patent: Dec. 12, 1989

[54] IRON CORE OF ELECTROMAGNET AND METHOD OF PRODUCING THE SAME

[75] Inventors: Katsuhiko Asano; Hiroshi Hashimoto, both of Hitachi, Japan

[73] Assignee: Hitachi, Ltd., Tokyo, Japan

[21] Appl. No.: 69,176

[22] Filed: Jul. 2, 1987

[30] Foreign Application Priority Data

Jul. 4, 1986 [JP] Japan .................................. 61-156064

[51] Int. Cl.$^4$ ............................................. H01F 3/00
[52] U.S. Cl. ..................................... 335/281; 335/297
[58] Field of Search ........................ 337/297, 296, 281; 336/216

[56] References Cited

U.S. PATENT DOCUMENTS 2,239,267 4/1941 Jeffrey ................................. 335/281
3,221,191 11/1965 Cuches et al. ...................... 335/281

FOREIGN PATENT DOCUMENTS 197806 6/1978 Fed. Rep. of Germany ...... 335/297
898004 4/1945 France ................................. 335/297

Primary Examiner—H. Broome
Attorney, Agent, or Firm—Antonelli, Terry & Wands

[57] ABSTRACT

The iron core of an electromagnet includes a stack of steel sheets stacked perpendicular to a horizontal axis, presents a sectional shape symmetrical with respect to the horizontal axis and is provided therein with a groove of a specified shape. The iron core is produced by stacking and integrating a desired number of steel sheets into a one-piece iron core and finally forming the specific shaped groove therein. Accordingly, no gaps are generated in the iron core and the density thereof becomes high even in the case of a sector iron core. Furthermore, the groove formation is conducted as a final step after the integration of the stacked steel sheets. Thus the heat during the welding operation for such an integration has no adverse effect on the groove in the iron core and the problem of lack of magnetic force is solved thereby.

10 Claims, 4 Drawing Sheets

IRON CORE OF ELECTROMAGNET AND METHOD OF PRODUCING THE SAME

BACKGROUND OF THE INVENTION

This invention relates to an iron core of an electromagnet and a method of producing the same, and more particularly to an iron core of an electromagnet suitable for use in accelerators, etc., composed of the stacked steel sheets and a method of producing the same.

Usually, an accelerator is equipped with a ring for accelerating or storing accelerated charged particle beams. The ring has an electromagnet for deflecting these charged particle beams. The electromagnet is composed of a coil and an iron core of the stacked steel sheets.

Conventionally, the steel sheets to be stacked are beforehand punched out into a specified shape or machined to provide a groove therein and the desired accuracy is obtained in this state. After that, the punched steel sheets are stacked by means of a stacking device. The stacked steel sheets are pressed and deformed, or the stack length difference is corrected. After all these steps, the sheets are welded or bonded together to form a one piece iron core.

Such an iron core will be described hereinunder by referring to an example of a sector iron core of an electromagnet.

The sector iron core is produced by stacking, in a direction of a deflection angle of charged particle beams or circumferentially, the required number of punched steel sheets each of which is shaped to provide a substantially C-shaped cross section and has a groove. Thereafter, the stacked sheets are integrally welded together by weld beads through end plates and side plates. The sectional shape of the sector iron core is symmetrical with respect to a horizontal axis. In the sector iron core, gaps are generated at an outer peripheral portion thereof because of the difference in the length of the outer and the inner arcs when steel sheets are stacked in the direction of deflection angle or circumferentially. Therefore, steel spacers are usually inserted in these gaps. Incidentally, the steel sheet has a thinner thickness at ends thereof depending on a capability of the rolling mill. These are thickness deviations called "edge drops". For this reason, especially in the case of an iron core of a wider section, gaps are generated on the ends of the iron core section when steel sheets are stacked in the direction of deflection angle of charged electron beams or circumferentially. Accordingly, steel sheet spacers are also inserted in the gaps in this part. Coils are disposed in a wider part of the groove and a beam duct is placed in a narrower part thereof for serving as the path for charged particle beams.

In the above-mentioned structure, however, gaps generated at the ends of the iron core caused by the thickness deviation cannot be completely eliminated even if these gaps are to be reduced by inserting steel sheet spacers. It is particularly impossible to completely fill with the steel spacers the gaps generated in an interior of a sector iron core of an electromagnet. This is because the shape of a gap is complicated depending on the producing conditions and so on, so that it is practically impossible to machine the steel spacer to adapt to the shape of the gap. Therefore, these gaps cannot be completely filled with the spacers and as a result an iron core of low density is produced.

Furthermore, in the conventional iron core, steel sheets are integrated into a one piece iron core after finishing all steps of processing (groove formation and general machining). Therefore, the deformation occurs in the iron core due to the welding heat on the occasion of integration. A groove which has been worked beforehand has low strength and this deformation is especially remarkable when heat is applied to such groove. The same occurs when gaps are existent.

Especially, when these iron cores used in an accelerator, a decrease in accuracy makes the path for charged particle beams unstable if the above-mentioned defect occurs in the iron core of electromagnet, because the bending electromagnet has the important function of guiding the path of charged particle beams that travel within the accelerator. Moreover, a decrease in the density of the iron core poses problems, such as lack of magnetic force (accuracy and size of a magnetic field generated by the iron core).

SUMMARY OF THE INVENTION

This invention is made in consideration of the foregoing problems. Therefore, it is an object of the invention to provide an iron core of an electromagnet made of stacked steel sheets, which has no gap therein thereby providing a high density iron core which is not influenced by heat when the steel sheets are integrally welded together. Further it is another object to provide a method of producing such iron core.

To this end, the present invention provides an iron core of an electromagnet having a sectional shape symmetrical with respect to a horizontal axis and is provided therein with a groove of a specified shape, in which a plurality of steel sheets are stacked perpendicularly to the horizontal axis. The present invention also provides a method of producing an iron core of an electromagnet by which a specified number of steel sheets are stacked and integrated into a one-piece core segment and thereafter a groove of specified shape is formed within the iron core as the final step.

Because the iron core of an electromagnet in accordance with the invention is made by stacking a plurality of steel sheets perpendicularly to the horizontal axis, no gaps are generated even if the iron core has the shape of a sector, so that the density becomes high. Furthermore, because the groove formation is conducted as the final step after the stacking and the integration of a specified number of steel sheets, the groove is not present when welding and other processing are carried out to integrate the stacked steel sheets into a one-piece core segment, so that the iron core has sufficient strength and is not deformed even by heat, etc.

The above and other objects and features of the invention will be apparent from the following description of the preferred embodiments in connection with the accompanying drawings.

DETAILED DESCRIPTION OF PREFERRED EMBODIMENTS

Figure 1:
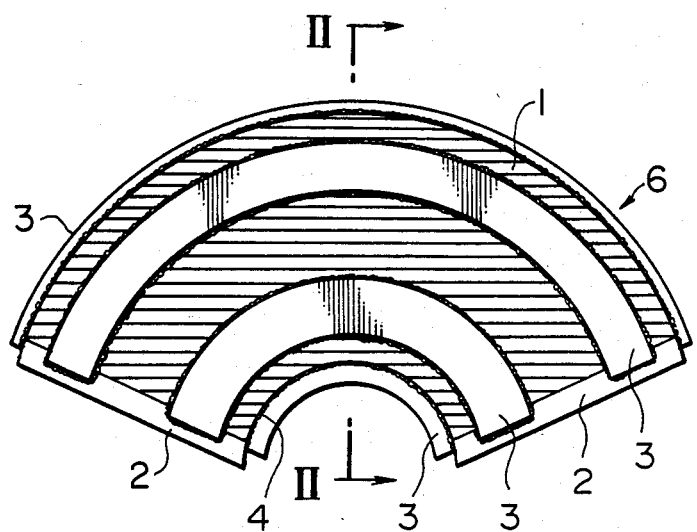
FIG. 1 is a plan view showing a sector iron core of an electromagnet in accordance with a first embodiment of the invention.
Figure 2:
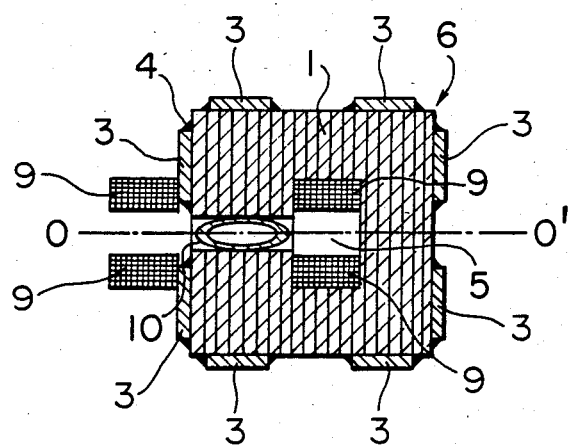
FIG. 2 is a sectional view taken along the line I—I of FIG. 1.

As apparent from FIGS. 1 and 2, a sector iron core 6 of an electromagnet is made of a stack of steel sheets 1 and has a substantially C-shaped cross section and a groove 5. The cross sectional shape of the iron core 6 is symmetrical with respect to a horizontal axis (line 0—0' in FIG. 2). A coil 9 is disposed in a wider part of the groove 5 and a beam duct 10 is disposed in a narrower part thereof for serving as a path for charged particle beams. End plates 2 and side plates 3 are placed on a periphery of the iron core 6 and the steel sheets 1 are integrally welded to each other by weld beads 4 through the end plates 2 and the side plates 3. This embodiment is characterized in that the sector iron core 6 is formed by stacking up a plurality of steel sheets 1 each extending perpendicularly to the horizontal axis.

Next, the producing process of the iron core 6 will be described hereinunder by referring to FIGS. 3A to 3H.

Figure 3A:
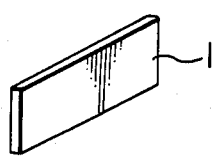
FIGS. 3A to 3H are perspective views showing producing process of the sector iron core.
Figure 3B:
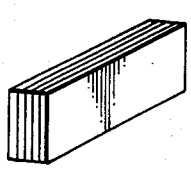
Figure 3C:
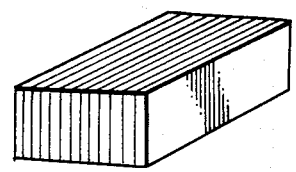
Figure 3D:
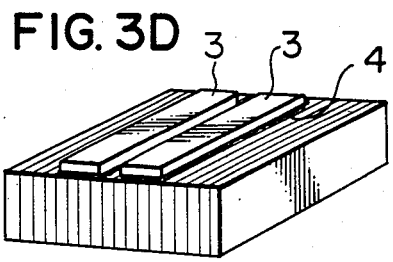
Figure 3E:
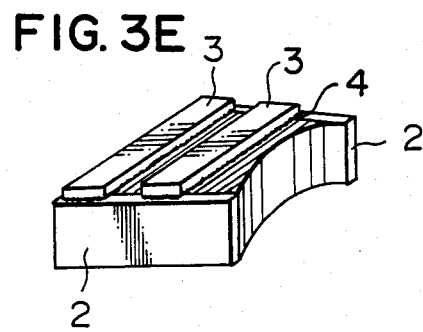
Figure 3F:
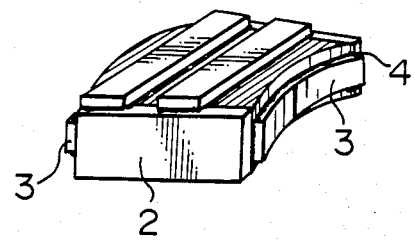
Figure 3G:
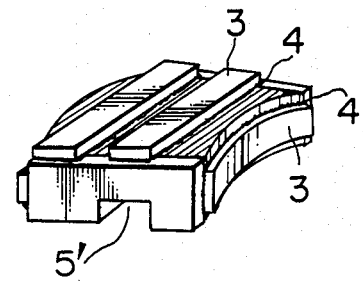
Figure 3H:
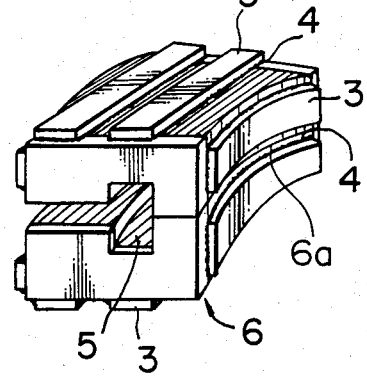

First, a plurality of rectangular steel sheets 1 (shown in FIG. 3A, are stacked up as shown in FIG. 3B and then assembled into a core half presenting a rectangular parallelepiped as shown in FIG. 3C. Side plates 3 are applied on an upper surface of the core half and all the steel sheets 1 are integrally welded by weld beads 4 through the side plates 3 as shown in FIG. 3D. Next, as shown in FIG. 3E, both sides of the core half are machined to provide curved surfaces and both ends thereof are also machined to provide end surfaces extending towards a centre axis of a sector, to which end plates 2 are applied. Finally the iron core half presents a sector shape in a plane view as shown in FIG. 1. As shown in FIG. 3F, side plates 3 are also welded to these curved surfaces by weld beads 4. In this condition, a groove portion 5' for housing the coil 9 and the beam duct 10 is formed in the iron core half as shown in FIG. 3G. Next, another iron core half produced in the same manner as mentioned above is prepared and the two iron core halves are mated with each other through a junction 6a so as to provide the groove 5 therebetween and jointed together to form the sector iron core 6 as shown in FIG. 3H. According to the sector iron core 6 of an electromagnet with a substantially C-shaped cross-section is obtained.

According to this embodiment, because a plurality of the steel sheets 1 are stacked perpendicularly to the horizontal axis or in a radial direction, no gaps are generated in the sector iron core 6 in spite of a difference in an inner and an outer peripheries of the sector iron core 6. In addition, the gaps at the ends of the sector core 6 resulting from the "edge drop" are not generated because the ends of the steel sheet 1 are removed in the machining process for forming the shape of a sector. Accordingly, the iron core can obtain a high density and the steel spacers which have so far been used to fill the gaps become unnecessary, thus providing advantages in economy as well as in ease of work. Moreover, because the final step of groove formation is conducted after the integration of the steel sheets into a one-piece core 6, no weak portions in terms of strength are formed during welding. Accordingly a deformation due to heat dose not occur any more, and groove formation can be conducted with high accuracy. Therefore, the problems of accuracy of a magnetic field generated by the iron core and of lack of magnetic force, such as size of magnetic field, can be solved.

Figure 4:
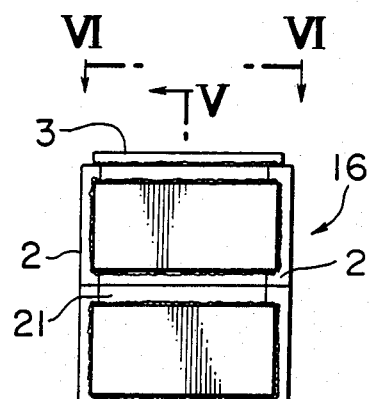
FIG. 4 is a side view showing a rectangular iron core of an electromagnet as another embodiment of the invention.
Figure 5:
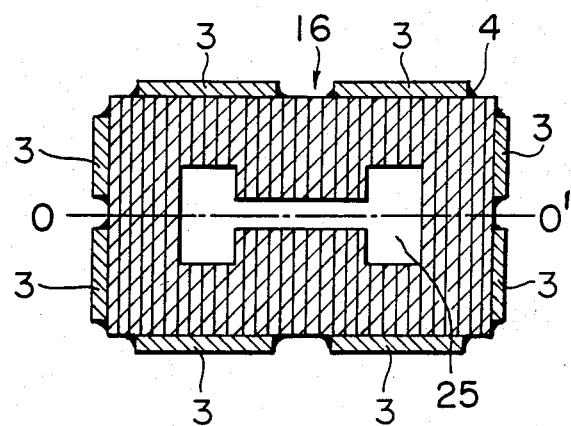
FIG. 5 is a sectional view taken along the line V—V of FIG. 4.
Figure 6:
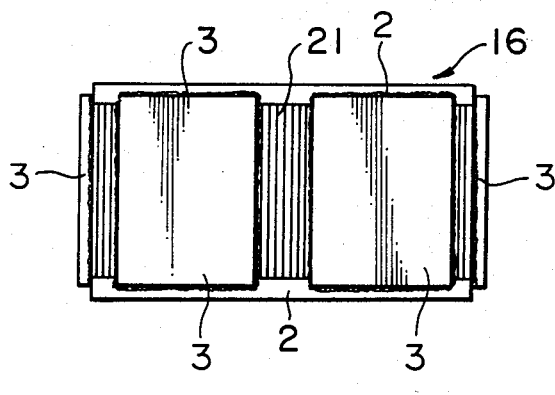
FIG. 6 is a plane view seen from a direction of the line VI—VI of FIG. 4.

Another embodiment of the present invention is illustrated in FIGS. 4 to 6.

Figure 7A:
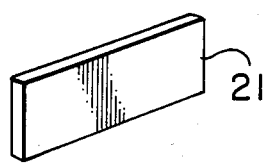
FIGS. 7A to 7E are perspective views showing the producing process of the rectangular iron core shown in FIGS. 4 to 6.
Figure 7B:
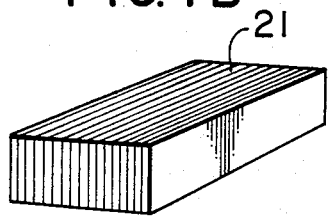
Figure 7C:
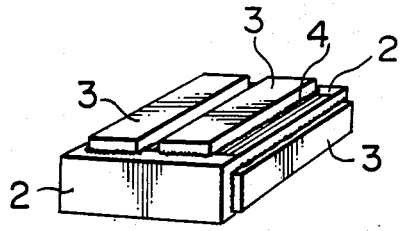
Figure 7D:
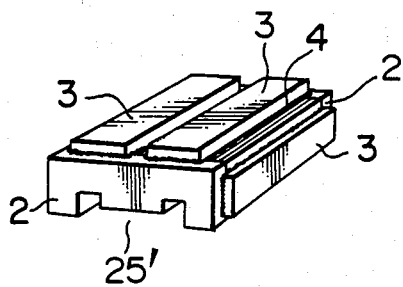
Figure 7E:
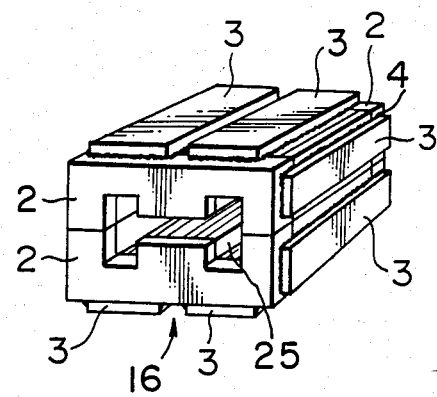

An iron core 16 of an electromagnet has a rectangular plane shape and provides a groove 25 of an H-shaped section. In the iron core 16, the steel sheets 21 are also stacked perpendicularly to the horizontal axis (line 0—0' in FIG. 5). The producing process of this iron core 16 will be described in connection with FIGS. 7A to 7E. First, a plurality of rectangular steel sheets 21 (FIG. 7A) are stacked together to form an iron core half of rectangular parallelepiped as shown in FIG. 7B. Then, as shown in FIG. 7C, end plates 2 and side plates 3 are applied to the iron core half and then the steel sheets 21 are welded into a one-piece core half by weld beads 4 through these plates 2, 3. After that, as shown in half FIG. 7D, a groove half 25' is formed in the iron core half by machining. Another iron core half made in the same manner as described in the procedure is prepared and the two iron core halves are joined with each other on the horizontal axis (line 0—0') as shown in FIG. 7E, so that an iron core 16 of an electromagnet in which a section of the groove 25 is almost H-shaped is obtained.

The effect of this second embodiment is almost the same as that of the first embodiment. This second embodiment is especially advantageous when the length of the iron core is small compared with the sectional width in view of the "edge drop".

Incidentally, in the above-mentioned embodiments, the descriptions are given by taking, as examples, an iron core of an electromagnet whose section is C-shaped or which has an H-shaped groove. In addition to these types, there is a window frame type in which the groove is at the center of the section of the iron core. Furthermore, the descriptions related to the iron cores of a sector plane view and of a rectangular plane view are made in connection with the iron cores whose section is C-shaped and whose groove has an H-shaped sectional view, respectively. However, the present invention is not limited to these iron cores and any shape of the iron core can be selected. In addition, the deflection angle may be 180 degrees in the case of the sector iron core of the electromagnet.

What is claimed is:

1. An iron core comprising:
    a stack of a plurality of steel sheets providing a sectional shape symmetrical with respect to a horizontal axis, said steel sheets being stacked perpendicular to said horizontal axis to form a one-piece iron core; and
    a groove of a specified shape provided within said iron core;
    wherein said iron core has a substantially C-shaped section and a sector plane view, and side and end plates are attached to peripheral surfaces of said iron core, through which said steel sheets are welded and fixed together.
2. An iron core comprising:

a stack of a plurality of steel sheets providing a sectional shape symmetrical with respect to a horizontal axis, said steel sheets being stacked perpendicular to said horizontal axis to form a one-piece iron core; and a groove of a specified shape provided within said iron core;

wherein said groove presents an H-shape and said iron core has a sector plane view, and side and end plates are attached to peripheral surfaces of said iron core, through which said steel sheets are welded and fixed together.

3. An iron core comprising:

a stack of a plurality of steel sheets providing a sectional shape symmetrical with respect to a horizontal axis, said steel sheets being stacked perpendicular to said horizontal axis to form a one-piece iron core; and a groove of a specified shape provided within said iron core;

wherein said iron core has a substantially C-shaped section and a rectangular plane view, and side and end plates are attached to peripheral surfaces of said iron core, through which said steel sheets are welded and fixed together.

4. An iron core comprising:

a stack of a plurality of steel sheets providing a sectional shape symmetrical with respect to a horizontal axis, said steel sheets being stacked perpendicular to said horizontal axis to form a one-piece iron core; and a groove of a specified shape provided within said iron core;

wherein said groove presents an H-shape and said iron core has a rectangular plane view, and side and end plates are attached to peripheral surfaces of said iron core, through which said steel sheets are welded and fixed together.

5. A method of producing an iron core of an electromagnetic comprising the steps of:

stacking a desired number of steel sheets;

fixing said steel sheets together into a one-piece iron core; and finally forming a groove of a specific shape within said iron core wherein said steel sheets are stacked perpendicular to a horizontal axis into an iron core half and machining a groove half on said iron core half, and wherein said method further comprises the steps of preparing two said iron core halves and fixing said iron core halves together into a one-piece iron core to form the groove therebetween.

6. A method according to claim 5, wherein said steel sheets are stacked into said iron core half of a rectangular plane view, and said method further comprises the step of matching said iron core half is not a sector plane view one having curved peripheries and opposite ends extending towards a centre axis of the sector.

7. A method according to claim 6, wherein said method further comprises the steps of applying side and end plates onto peripheral surfaces of said sector plane view iron core half and welding said steel sheets with each other through said side and end plates.

8. An iron core of an electromagnet comprising:

a stack of a plurality of steel sheets providing a sectional shape symmetrical with respect to a horizontal axis, said steel sheets being stacked along said horizontal axis such that each of said steel sheets extends in a direction perpendicular to said horizontal axis; and a groove of a specific shape provided within said steel sheets and extending in a direction perpendicular to a stack direction, said stack direction being parallel to said horizontal axis.

9. A method of producing an iron core of an electromagnet comprising the steps of:

stacking a desired number of steel sheets along a horizontal axis such that each of said steel sheets extends in a direction perpendicular to said horizontal axis;

fixing said steel sheets together into a one-piece iron core; and finally machining said iron core in a direction perpendicular to a stack direction to form a groove of a specific shape therein, said stack direction being parallel to said horizontal direction.

10. A method according to claim 9, wherein said steel sheets are stacked along a horizontal axis such that each of said steel sheets are perpendicularly positioned to said horizontal axis.

* * * * *